United States Patent
Wakita et al.

(10) Patent No.: US 7,309,726 B2
(45) Date of Patent: Dec. 18, 2007

(54) STRAIGHT-OIL FINISHING COMPOSITION AND FIBER YARN TREATED THEREWITH

(75) Inventors: Mari Wakita, Chiba Prefecture (JP); Hisataka Nakashima, Chiba Prefecture (JP); Hideki Kobayashi, Chiba Prefecture (JP)

(73) Assignee: Dow Corning Toray Silicone Co., Ltd., Chiyoda-ku, Tokyo (JP)

( * ) Notice: Subject to any disclaimer, the term of this patent is extended or adjusted under 35 U.S.C. 154(b) by 119 days.

(21) Appl. No.: 10/530,458

(22) PCT Filed: Oct. 10, 2003

(86) PCT No.: PCT/JP03/13090

§ 371 (c)(1),
(2), (4) Date: Oct. 25, 2005

(87) PCT Pub. No.: WO2004/033555

PCT Pub. Date: Apr. 22, 2004

(65) Prior Publication Data

US 2006/0163523 A1    Jul. 27, 2006

(30) Foreign Application Priority Data

Oct. 11, 2002 (JP) ............................. 2002-298175

(51) Int. Cl.
*C08K 5/5419* (2006.01)
(52) U.S. Cl. ...................... 524/265; 524/266; 524/588; 252/8.83; 8/DIG. 1

(58) Field of Classification Search ................ 524/265, 524/266, 588; 252/8.83; 8/DIG. 1
See application file for complete search history.

(56) References Cited

U.S. PATENT DOCUMENTS

| | | | |
|---|---|---|---|
| 3,294,737 A | 12/1966 | Krantz | |
| 3,296,063 A | 1/1967 | Chandler | |
| 3,684,756 A * | 8/1972 | Brooks | 524/731 |
| 3,819,745 A | 6/1974 | Plante | |
| 3,836,647 A * | 9/1974 | Lange | 514/63 |
| 3,872,038 A * | 3/1975 | Adams et al. | 523/336 |
| 4,087,478 A | 5/1978 | Keil | |
| 6,245,431 B1 * | 6/2001 | Griswold et al. | 428/450 |
| 6,767,982 B2 * | 7/2004 | Standke et al. | 528/20 |
| 6,841,197 B2 * | 1/2005 | Standke et al. | 427/387 |
| 7,019,069 B2 * | 3/2006 | Kobayashi et al. | 524/588 |

FOREIGN PATENT DOCUMENTS

| | | |
|---|---|---|
| JP | 42-8438 | 4/1965 |
| JP | 63-12197 | 3/1988 |

* cited by examiner

*Primary Examiner*—Margaret G. Moore
(74) *Attorney, Agent, or Firm*—Howard & Howard Attorneys, P.C.

(57) ABSTRACT

The invention relates to a straight-oil finishing composition comprising (A) 100 parts by weight of a polydimethylsiloxane oil or liquid paraffin having a viscosity of 3 to 70 mm²/s at 25 centigrade temperature; and (B) 0.5 to 100 parts by weight of an organopolysiloxane resin, which contains silanol groups and silicon-bonded alkoxy groups and wherein 20 mole % or more of all siloxane units are siloxane units represented by formula $C_3H_7SiO_{3/2}$. This composition is useful for treating fiber yarn.

13 Claims, No Drawings

STRAIGHT-OIL FINISHING COMPOSITION AND FIBER YARN TREATED THEREWITH

The invention relates to a straight-oil finishing composition useful for treating fiber yarn which has improved storage stability and antistatic properties, and a fiber yarn treated with the straight-oil finishing composition.

Various silicones find wide application in compositions of straight-oil type treatment agents which receive their name because they are free of any water or solvents. For example, it was proposed to use a mixture of polyamylsiloxane and polydimethylsiloxane as a lubricity-improving agent for Spandex or similar elastic filaments (see Japanese Patent Publication (hereinafter referred to as Kokoku) No. Sho 42-8438). However, this oil-type treatment agent utilizes expensive polyamylsiloxane. Furthermore, production of polyamylsiloxane may be accompanied by variations in the amount of silanol groups contained in this composition, as well as by variations in antistatic properties. A yarn-treating composition obtained by combining a dimethylsiloxane oil with the product of copolymerization of an MQ-type silicone resin and a DT-type silicone resin (see Kokoku No. Sho 63-12197) is also known. A drawback of the aforementioned product of copolymerization of the silicone resins is that copolymerization of the silicone resin is difficult to control and that viscosity and antistatic properties of the obtained oil-type treatment agent are subject to variations.

One object of the invention to provide a straight-oil finishing composition, which has excellent storage stability and antistatic properties.

The present invention relates to a straight-oil finishing composition comprising
(A) 100 parts by weight of a polydimethylsiloxane oil or liquid paraffin having a viscosity of 3 to 70 mm²/s at 25° C.; and
(B) 0.5 to 100 parts by weight of an organopolysiloxane resin which contains silanol groups and silicon-bonded alkoxy groups and 20 mole % or more of all siloxane units are represented by the formula $C_3H_7SiO_{3/2}$.

Among other things, this straight-oil finishing composition is useful for treating fiber yarn.

Component (A) is a main component of the composition of the invention. Its function is to impart smoothness to the fiber yarn. It is recommended that the viscosity at 25° C. of the polydimethylsiloxane oil or liquid paraffin used in this component be within the range of 3 to 70 mm²/s, preferably 3 to 50 mm²/s, and even more preferably, 3 to 30 mm²/s. This is because, if the viscosity is below 3 mm²/s, the treated filament will have insufficient smoothness and if the viscosity exceeds 70 mm²/s, too much of the treatment agent will adhere to the fiber filament. The molecular structure of the polydimethylsiloxane oil of component (A) may be linear, cyclic, or partially branched. In the case of a linear or partially branched molecular structure, it is recommended to cap the molecular terminals with groups such as trialkylsiloxy or hydroxyl groups. The liquid paraffin useful in component (A) should have a high degree of purity, be colorless, and free of taste and odor.

Component (B) is a distinguishing component of the composition of the invention and comprises an organopolysiloxane resin which is compatible with component (A). It is required that 20 mole % or more of all siloxane units of this organopolysiloxane resin are represented by the formula $C_3H_7SiO_{3/2}$ and that each molecule of the aforementioned resin contain one or more silanol groups and one or more silicon-bonded alkoxy groups. It is recommended that, in addition to the aforementioned siloxane units, this component contain siloxane units of formula $C_3H_7(HO)_a(R'O)_bSiO_{(3-a-b)/2}$, where each R' is an independently selected from alkyl group having 1 to 8 carbon atoms and alkyloxyalkylene group having 1 to 8 carbon atoms. Examples of alkyl groups useful as R' include methyl, ethyl, propyl, butyl, hexyl, and octyl. Examples of alkyloxyalkylene groups useful as R' include methoxyethylene, and ethoxyethylene. Most preferably from the point of view of better compatibility with component (A), the R' groups are independently selected from all groups having 3 to 8 carbon atoms and alkyloxyalkylene groups having 3 to 8 carbon atoms, with alkyl groups having 3 to 8 carbon atoms being even more preferable. In the above formula, $0<a\leq2$; $0<b\leq2$ and $0<(a+b)\leq2$. It is recommended that the amount of silanol groups contained in component (B) be greater than the amount of alkoxy groups so a>b. Siloxane units of formula $C_3H_7SiO_{3/2}$ preferably comprise 20 to 95 mole % of all siloxane units, while siloxane units of formula $C_3H_7(HO)_a(R'O)_b SiO_{(3-a-b)/2}$ preferably comprise 5 to 80 mole % of all siloxane units. The sum of both siloxane units should be 40 mole % or more of all siloxane units and preferably should occupy 60 to 100 mole %.

The organopolysiloxane resin can be represented by the following average constitutional formula:

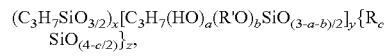

where R', a and b are as defined above; each R is an independently selected phenyl group, alkyl group having 1 to 10 carbon atoms, hydroxyl group, or alkoxy group. Examples of the alkyl group include methyl, ethyl, butyl, hexyl, octyl, and decyl. The most preferable from the point of view of compatibility with component (A) is methyl. Alkoxy groups may be the same as the aforementioned (R'O) groups; c is between 0 and 3; x>0, y>0, z≧0, (x+y+z)=1 and x/(x+y+z)≧0.2. In addition, it is recommended (x+y)/(x+y+z)≧0.4 and more preferably (x+y)/(x+y+z)≧0.6 The weight-average molecular weight of component (B) should be within the range of 800 to 20000, preferably 1000 to 8000. Examples of component (B) include the following organopolysiloxane resins where a is 1 or 2 and b is 1 or 2:

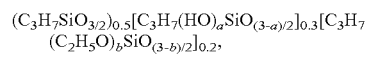

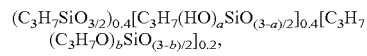

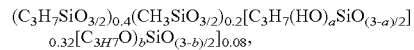

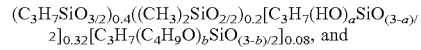

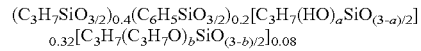

Component (B) is obtained by hydrolyzing an organoalkoxysilane or organoalkoxysilanes. For example, it can be produced by hydrolyzing propyltrimethoxysilane, propyltriethoxysilane, propyltri(n-propoxy)silane, propyltri(i-propoxy)silane, or by co-hydrolyzing the aforementioned propylalkoxysilanes with various alkoxysilanes. Examples of these alkoxysilanes include methyltrimethoxysilane, methyltriethoxysilane, methyltri(i-propoxy)silane, dimethyldimethoxysilane, and phenyltrimethoxysilane. The propyltrichlorosilane can also be hydrolyzed in the presence of alcohol. In this case, co-hydrolyzation can be carried out by adding methyltrichlorosilane, dimethyldichlorosilane, phenyltrichlorosilane, or similar chlorosilanes and methyltriethoxysilane, methyltriethoxysilane, methyltri(i-propoxy)silane, or similar methylalkoxysilane. Alcohols suitable for these purposes include methanol, ethanol, n-propyl alcohol, i-propyl alcohol, butanol, methoxy ethanol, ethoxy ethanol, or similar alcohols. Examples of hydrocarbon-type solvents which can also be concurrently used include toluene, xylene, or similar aromatic hydrocarbons; hexane, heptane, isooctane, or similar linear or partially branched saturated hydrocarbons; and cyclohexane, or similar aliphatic hydrocarbons.

Component (B) should be used in an amount of 0.5 to 100 parts by weight, preferably 10 to 70 parts by weight for each 100 parts by weight of component (A). If it is used in an amount smaller than the lower allowable limit, it will not be able to reveal its properties. If, however, it is used in an amount exceeding the upper recommended level, too much of component (B) will adhere to the treated product.

The composition of the invention is produced by merely mixing the aforementioned components (A) and (B). If necessary, in addition to the aforementioned components, the composition of the invention may be compounded with various additives. Such additives may include metal salts of higher fatty acids that antistick characteristics to the fiber yarn, for example magnesium stearate, zinc stearate, calcium stearate, and barium stearate. If necessary, the composition can be combined with anti-corrosive agents and charge-resistant agents. However, the composition should not contain ether-modified polyorganosiloxanes, such as polyorganosiloxane modified with ethylene oxide or polyorganosiloxane modified with propylene oxide.

Fiber yarn may be treated with the compositions, for example, by immersion in a treatment bath of the compositions of the invention followed by roll expression, or by bringing the running fiber yarn into contact with pick-up rolls. The generally preferred add-on amount for the composition of this invention may be different depending on the type of the fiber yarn but it is preferably within the range of 0.05 to 9.0 wt. %. Types of fiber yarn that can be treated with compositions of the invention include for example, natural fibers such as wool, silk, flax, cotton, angora, and mohair; regenerated fibers such as Rayon and Bemberg; semi-synthetic fibers such as acetate; and synthetic fibers such as polyester, polyamide, polyacrylonitrile, polyvinyl chloride, vinylon, polyethylene, polypropylene, and polyurethane (Spandex). As used herein, the word "yarn" refers to continuous filament thread, spun yarn, or tow.

The straight-oil treatment composition described above is characterized by improved antistatic properties, excellent compatibility with other components, and improved storage stability. This is achieved due to the use of the component (B) having a specific molecular structure. Furthermore, since component (B) can be synthesized at a relatively low cost, the composition of the invention can be advantageously used in commercial production.

The invention will now be described with reference to practical examples. In the examples hereinbelow, "parts" denotes "weight parts", "%" denotes "weight %", and the viscosity is the value at 25° C. The storage stability and compatibility were measured by the methods described below.

Compatibility—Immediately after preparation, 20 cc of the straight-oil fiber treatment composition was placed in a glass bottle, and its appearance was visually inspected. The compatibility was rated according to the following scale:

○: denotes homogeneous dissolution and transparency

Δ: denotes slight white turbidity

X: denotes significant white turbidity

Storage Stability—The straight-oil fiber treatment composition was placed in a glass bottle and stored for 1 week at 25° C. and then was inspected visually. The storage stability was rated according to the following scale:

○: denotes homogeneous dissolution and transparency

Δ: denotes slight separation and precipitation

X: denotes significant separation and precipitation

SYNTHESIS EXAMPLE 1

A four-neck flask equipped with a cooling pipe, thermometer, and a stirrer was loaded with 722 g of n-propyltrichlorosilane and 488 g of toluene. While the components were stirred, a mixture of 137 g of water and 317 g of isopropyl alcohol was added dropwise. Upon completion of the addition, the mixture was heated to 70° C. and stirred for 30 min. The mixture was then cooled, and the separated water layer was removed. The organic layer was then washed three times with water. The product was combined with 1000 g of water in which 10 g of sodium hydroxide was dissolved, and the components were mixed for 1 hour and washed three times with water. The cooling tube was replaced with a water separation tube, the product was heated, water was azeotropically removed, the solvent was removed by stripping, and, as result, a highly viscous organopolysiloxane was obtained. Analysis using $^{13}$C-NMR, $^{29}$Si-NMR, and GPC showed that the obtained organopolysiloxane resin (TP-1) with a weight-average molecular weight of 4800 was represented by the following constitutional formula:

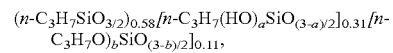

where a=1 or 2, and b=1 or 2.

SYNTHESIS EXAMPLE 2

A four-neck flask equipped with a cooling pipe, thermometer, and a stirrer was loaded with 722 g of n-propyltrichlorosilane and 488 g of toluene. While the components were stirred, a mixture of 137 g of water, 18 g of methyltriisopropoxysilane, and 300 g of isopropyl alcohol was added dropwise. Upon completion of the addition, the mixture was heated to 70° C. and stirred for 30 min. The mixture was then cooled, and the separated water layer was removed. The organic layer was &en washed three times with water. The product was combined with 1000 g of water in which 10 g of sodium hydroxide was dissolved, and the components were mixed for 1 hour and washed three times with water. The cooling tube was replaced with a water separation tube, the product was heated, water was azeotropically removed, the solvent was removed by stripping, and, as result, a highly viscous organopolysiloxane was obtained. Analysis wing $^{13}$C-NMR, $^{29}$Si-NMR, and GPC showed that the obtained organopolysiloxane resin (TP-2) with a weight-average molecular weight of 4000 was represented by the following constitutional formula:

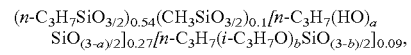

where a=1 or 2, and b=1 or 2.

SYNTHESIS EXAMPLE 3

A four-neck flask equipped with a cooling pipe, thermometer, and a stirrer was loaded with 722 g of n-propyltrichlorosilane and 488 g of toluene. While the components were stirred, 137 g of water was added dropwise. Upon completion of the addition, the mixture was heated to 70° C. and sired for 30 min. The mixture was then cooled, and the separated water layer was removed. The organic layer was then washed three times with water. The product was combined with 1000 g of water in which 10 g of sodium hydroxide was dissolved, and the components were mixed for 1 hour and washed three times with water. The cooling tube was replaced with a water separation tube, the product was heated, water was azeotropically removed, the solvent was removed by stripping, and, as result, a highly viscous organopolysiloxane was obtained. Analysis using $^{13}$C-NMR, $^{29}$Si-NMR and GPC showed that the obtained organopolysiloxane resin (TP-3) with a weight-average molecular weight of 5000 was represented by the following constitutional formula:

$$(n\text{-}C_3H_7SiO_{3/2})_{0.64}[n\text{-}C_3H_7(HO)_aSiO_{(3-a)/2}]_{0.36},$$

where a=1 or 2.

PRACTICAL EXAMPLE 1

A straight-oil fiber treatment composition was prepared by uniformly mixing 30 g of the organopolysiloxane resin (TP-1) obtained in Synthesis Example 1 and 70 g of liquid paraffin having a viscosity of 12 mm$^2$/s. The obtained straight-oil fiber treatment composition comprised a transparent solution having a viscosity of 24 mm$^2$/s, a specific gravity of 0.87, and a refractory index of 1.453. Compatibility and storage stability of the obtained straight-oil fiber treatment composition were measured. Volume resistivity was measured with the use of a volume-resistivity measurement instrument of Hewlett Packard Co. by a method for measuring volume resistivity (250V/1 min) specified by JIS C2101. All results of measurements and evaluation are shown in Table 1.

PRACTICAL EXAMPLE 2

A straight-oil fiber treatment composition was prepared by uniformly mixing 30 g of the organopolysiloxane resin (TP-1) obtained in Synthesis Example 1 and 70 g of liquid paraffin having a viscosity of 17 mm$^2$/s. The obtained straight-oil fiber treatment composition comprised a transparent solution having a viscosity of 30 mm$^2$/s, a specific gravity of 0.91, and a refractory index of 1.456. Compatibility and storage stability of the obtained straight-oil fiber treatment composition were measured. Volume resistivity was measured by the same method as in Practical Example 1. All results of measurements and evaluation are shown in Table 1.

PRACTICAL EXAMPLE 3

A straight-oil fiber treatment composition was prepared by uniformly mixing 10 g of the organopolysiloxane resin (PIT-1) obtained in Synthesis Example 1 and 90 g of liquid paraffin having a viscosity of 12 mm$^2$/s. Compatibility and storage stability of the obtained straight-oil fiber treatment composition were measured. Volume resistivity was measured by the same method as in Practical Example 1. All results of measurements and evaluation are shown in Table 1.

PRACTICAL EXAMPLE 4

A straight-oil fiber treatment composition was prepared by uniformly mixing 20 g of the organopolysiloxane resin (TP-1) obtained in Synthesis Example 1 and 80 g of liquid paraffin having a viscosity of 12 mm$^2$/s. Compatibility and storage stability of the obtained straight-oil fiber treatment composition were measured. Volume resistivity was measured by the same method as in Practical Example 1. All results of measurements and evaluation are shown in Table 1.

PRACTICAL EXAMPLE 5

A straight-oil fiber treatment composition was prepared by uniformly mixing 30 g of the organopolysiloxane resin (TP-2) obtained in Synthesis Example 2 and 70 g of liquid paraffin having a viscosity of 12 mm$^2$/s. The obtained straight-oil fiber treatment composition was transparent. Compatibility and storage stability of the obtained straight-oil fiber treatment composition were measured. Volume resistivity was measured by the same method as in Practical Example 1. All results of measurements and evaluation are shown in Table 1.

PRACTICAL EXAMPLE 6

A straight-oil fiber treatment composition was prepared by uniformly mixing 30 g of the organopolysiloxane resin (TP-1) obtained in Synthesis Example 1 and 70 g of an oil of polydimethylsiloxane having both molecular terminals capped with trimethylsiloxy groups and having a viscosity of 10 mm$^2$/s. Compatibility and storage stability of the obtained straight-oil fiber treatment composition were measured. Volume resistivity was measured by the same method as in Practical Example 1. All results of measurements and evaluation are shown in Table 1.

COMPARATIVE EXAMPLE 1

A straight-oil fiber treatment composition was prepared by uniformly mixing 30 g of the organopolysiloxane resin (IP-3) obtained in Synthesis Example 3 and 70 g of liquid paraffin having a viscosity of 12 mm$^2$/s. The obtained straight-oil fiber treatment composition comprises a semi-transparent solution with a noticeable precipitation. Compatibility and storage stability of the obtained straight-oil fiber treatment composition were measured. All results of measurements and evaluation are shown in Table 1.

COMPARATIVE EXAMPLE 2

Storage stability was measured for a strait-oil fiber treatment composition that comprised 100 g only of liquid paraffin of a viscosity of 12 mm$^2$/s. Volume resistivity was measured by the same method as in Practical Example 1. All results of measurements and evaluation are shown in Table 1.

TABLE 1

|  | (A) | | (B) | | Storage | Volume | |
|  | Type | Content % | Type | Content % | Compatibility | Stability | Resistivity | Evaluation |
|---|---|---|---|---|---|---|---|---|
| Pr. Ex. 1 | A-1 | 70 | TP-1 | 30 | ○ | ○ | $2 \times 10^{13}$ | Good |
| Pr. Ex. 2 | A-2 | 70 | TP-1 | 30 | ○ | ○ | $2 \times 10^{13}$ | Good |
| Pr. Ex. 3 | A-1 | 90 | TP-1 | 10 | ○ | ○ | $4 \times 10^{13}$ | Good |
| Pr. Ex. 4 | A-1 | 80 | TP-1 | 20 | ○ | ○ | $3 \times 10^{13}$ | Good |

TABLE 1-continued

|  | (A) | | (B) | | Storage | | Volume | |
|---|---|---|---|---|---|---|---|---|
|  | Type | Content % | Type | Content % | Compatibility | Stability | Resistivity | Evaluation |
| Pr. Ex. 5 | A-1 | 70 | TP-2 | 30 | ○ | ○ | $3 \times 10^{13}$ | Good |
| Pr. Ex. 6 | A-3 | 70 | TP-1 | 30 | ○ | ○ | $3 \times 10^{13}$ | Good |
| Comp. Ex. 1 | A-1 | 70 | TP-3 | 30 | Δ | Δ | — | Unsatisfactory (insufficient compatibility and storage stability) |
| Comp. Ex. 2 | A-1 | 100 | — | 0 | — | ○ | $4 \times 10^{14}$ | Unsatisfactory (insufficient antistatic properties) |

\* Types of component (A):
A-1: liquid paraffin of 12 mm²/s viscosity
A-2: liquid paraffin of 17 mm²/s viscosity
A-3: polydimethylsiloxane oil of 10 mm²/s viscosity The straight-oil treatment composition of the invention, which has aforementioned main components (A) and (B), is characterized by excellent component compatibility, storage stability, and anti-static properties.

The invention claimed is:

1. A straight-oil finishing composition comprising
   (A) 100 parts by weight of a polydimethylsiioxane oil or liquid paraffin having a viscosity of 3 to 70 mm²/s at 25° C.; and
   (B) 0.5 to 100 parts by weight of an organopolysiloxane resin, which contains silanol groups and silicon-bonded alkoxy groups, wherein 20 mole % or more of all siloxane units are siloxane units represented by formula $C_3H_7SiO_{3/2}$, and wherein the amount of silanol groups is greater than the amount of the silicon-bonded alkoxy groups.

2. The straight-oil finishing composition according to claim 1, where said component (A) is liquid paraffin.

3. A straight-oil finishing composition comprising
   (A) 100 parts by weight of a polydimethylsiioxane oil or liquid paraffin having a viscosity of 3 to 70 mm²/s at 25° C.: and
   (B) 0.5 to 100 parts by weight of an organopolysiloxane resin, which contains silanol groups and silicon-bonded alkoxy groups, wherein 20 mole % or more of all siloxane units are siloxane units represented by formula $C_3H_7SiO_{3/2}$, and wherein said silicon-bonded alkoxy groups are alkoxy groups having 3 to 8 carbon atoms.

4. The straight-oil finishing composition according to claim 3, where said component (A) is liquid paraffin.

5. A fiber yarn treated with the straight-oil finishing composition of claim 3.

6. A straight-oil finishing composition comprising
   (A) 100 parts by weight of a polydimethylsiioxane oil or liquid paraffin having a viscosity of 3 to 70 mm²/s at 25° C.; and
   (B) 0.5 to 100 parts by weight of an organopolysiloxane resin, which contains silanol groups and silicon-bonded alkoxy groups and wherein 20 mole % or more of all siloxane units are siloxane units represented by formula $C_3H_7SiO_{3/2}$; and
   where said component (B) contains both siloxane units represented by formula $C_3H_7SiO_{3/2}$ and $C_3H_7(HO)_a(R'O)_bSiO_{(3-a-b)/2}$, wherein 20-95 mole % of all siloxane units are siloxane units represented by formula $C_3H_7SiO_{3/2}$ and 5-80 mole % of all siloxane units are siloxane units represented by formula
   $$C_3H_7(HO)_a(R'O)_bSiO_{(3-a-b)/2},$$
   where each R' is independently selected from alkyl groups having 1 to 8 carbon atoms and alkyloxyalkylene groups having 1 to 8 carbon atoms, $0<a\leq2$, $0<b\leq2$, $0<(a+b)\leq2$.

7. The straight-oil finishing composition according to claim 6, where said component (A) is liquid paraffin.

8. A fiber yarn treated with the straight-oil finishing composition of claim 6.

9. A straight-oil finishing composition comprising
   (A) 100 parts by weight of a polydimethylsiioxane oil or liquid paraffin having a viscosity of 3 to 70 mm²/s at 25° C.; and
   (B) 0.5 to 100 parts by weight of an organopolysiloxane resin, which contains silanol groups and silicon-bonded alkoxy groups, wherein 20 mole % or more of all siloxane units are siloxane units represented by formula $C_3H_7SiO_{3/2}$, and where said component (B) is represented by the following average constitutional formula:

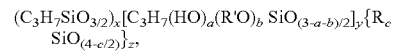

$$(C_3H_7SiO_{3/2})_x[C_3H_7(HO)_a(R'O)_b SiO_{(3-a-b)/2}]_y\{R_c SiO_{(4-c/2)}\}_z,$$

where each R' is independently selected from alkyl groups having 1 to 8 carbon atoms and alkyloxyalkylene groups having 1 to 8 carbon atoms, and each R is independently selected from phenyl groups, alkyl groups having 1 to 10 carbon atoms, hydroxyl groups, and alkoxy groups, $0<a\leq2$, $0<b\leq2$, $0<(a+b)\leq2$, c is between 0 and 3, $x>0$, $y>0$, $z\geq0$, $(x+y+z)=1$, and $x/(x+y+z)\geq0.2$.

10. The straight-oil finishing composition according to claim 9, where said component (A) is liquid paraffin.

11. A fiber yarn treated with the straight-oil finishing composition of claim 9.

12. A fiber yarn treated with the straight-oil finishing composition comprising
    (A) 100 parts by weight of a polydimethylsiioxane oil or liquid paraffin having a viscosity of 3 to 70 mm²/s at 25° C.; and
    (B) 0.5 to 100 parts by weight of an organopolysiloxane resin, which contains silanol groups and silicon-bonded alkoxy groups and wherein 20 mole % or more of all siloxane units are siloxane units represented by formula $C_3H_7SiO_{3/2}$.

13. A fiber yarn according to claim 12, where said component (A) is liquid paraffin.

\* \* \* \* \*

UNITED STATES PATENT AND TRADEMARK OFFICE
CERTIFICATE OF CORRECTION

PATENT NO. : 7,309,726 B2
APPLICATION NO. : 10/530458
DATED : December 18, 2007
INVENTOR(S) : Mari Wakita et al.

It is certified that error appears in the above-identified patent and that said Letters Patent is hereby corrected as shown below:

Column 7, line 40, after 25 °C delete [:], and insert therein --;--

Signed and Sealed this

Fifth Day of August, 2008

JON W. DUDAS
*Director of the United States Patent and Trademark Office*